US008173000B1

(12) United States Patent
Hadwen et al.

(10) Patent No.: US 8,173,000 B1
(45) Date of Patent: May 8, 2012

(54) ACTIVE MATRIX DEVICE AND METHOD OF DRIVING THE SAME

(75) Inventors: Benjamin James Hadwen, Oxford (GB); Adrian Marc Simon Jacobs, Reading (GB); Jason Roderick Hector, Oxford (GB); Gareth John, Berkshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/008,091

(22) Filed: Jan. 18, 2011

(51) Int. Cl.
*G01N 27/447* (2006.01)
*G01N 27/453* (2006.01)

(52) U.S. Cl. ........................................ 204/450; 204/600
(58) Field of Classification Search .................. 204/450, 204/451, 600, 601
See application file for complete search history.

(56) References Cited

U.S. PATENT DOCUMENTS

| 6,565,727 | B1 | 5/2003 | Shenderov |
| 6,911,132 | B2 * | 6/2005 | Pamula et al. ................ 204/600 |
| 7,163,612 | B2 | 1/2007 | Sterling et al. |
| 7,329,545 | B2 | 2/2008 | Pamula et al. |
| 7,667,946 | B2 * | 2/2010 | Choi et al. .................... 361/281 |

OTHER PUBLICATIONS

R.B. Fair, "Digital microfluidics: is a true lab-on-a-chip possible?", Microfluid Nanofluid (2007), 3 ; pp. 245-281.
Matsuda et al., "Ultra-Low Power System-LCDs with Pixel-Memory Circuit", Proceedings of IDW '09, pp. 243-246.
Hunt et al., "Integrated circuit/microfluidic chip to programmably trap and move cells and droplets with dielectrophoresis", Lab Chip, 2008, 8, pp. 81-87.

* cited by examiner

*Primary Examiner* — Alex Noguerola
(74) *Attorney, Agent, or Firm* — Renner, Otto, Boisselle & Sklar, LLP

(57) ABSTRACT

An active matrix electrowetting on dielectric (AM-EWOD) device which includes a plurality of array elements configured to manipulate one or more droplets of fluid on an array, each of the array elements including a corresponding array element circuit. Each array element circuit includes a top substrate electrode and a drive electrode between which the one or more droplets may be positioned; circuitry configured to write data to the corresponding array element by selectively applying to the drive electrode either: (i) a time-varying voltage waveform $V_1$ of amplitude $V_B$ and period $t_0$; or (ii) a time-varying voltage waveform $V_2$, the logical inverse of $V_1$, and applying to the top substrate electrode the time-varying voltage waveform $V_2+V_{offset}$, where $V_{offset}$ represents an offset voltage signal which may have AC and/or DC components and may equal zero.

28 Claims, 12 Drawing Sheets

*Figure 2: Prior art*

ACTIVE MATRIX DEVICE AND METHOD OF DRIVING THE SAME

TECHNICAL FIELD

The present invention relates to active matrix arrays and elements thereof.

In a particular aspect, the present invention relates to digital microfluidics, and more specifically to Active Matrix Electrowetting-On-Dielectric (AM-EWOD). Electrowetting-On-Dielectric (EWOD) is a known technique for manipulating droplets of fluid on an array. Active Matrix EWOD (AM-EWOD) refers to implementation of EWOD in an active matrix array, for example by using thin film transistors (TFTs). The invention further relates to methods of driving such a device.

BACKGROUND ART

Electrowetting on dielectric (EWOD) is a well known technique for manipulating droplets of fluid by application of an electric field. It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

U.S. Pat. No. 6,565,727 (Shenderov, issued May 20, 2003) discloses a passive matrix EWOD device for moving droplets through an array.

U.S. Pat. No. 6,911,132 (Pamula et al, issued Jun. 28, 2005) discloses a two dimensional EWOD array to control the position and movement of droplets in two dimensions.

U.S. Pat. No. 6,565,727 further discloses methods for other droplet operations including the splitting and merging of droplets and the mixing together of droplets of different materials. In general the voltages required to perform typical droplet operations are relatively high. Values in the range 20-60V are quoted in the prior art (e.g. U.S. Pat. No. 7,329,545 (Pamula et al., issued Feb. 12, 2008)). The value required depends principally on the technology used to create the insulator and hydrophobic layers.

A notable feature of the EWOD actuation mechanism is that the contact angle of the liquid droplet with the solid surface depends on the square of the actuation voltage; the sign of the applied voltage is unimportant to first order. It is thus possible to implement EWOD with either an AC or a DC drive scheme. FIG. 1 shows a typical timing sequence for an AC drive scheme. A voltage $V_T$ is applied to the electrode of the top substrate and for the simplicity of what follows may be assumed to be ground. In the case where the EW drive electrode is programmed low, the voltage $V_T$ is also applied to the EW drive electrode. In the case where the EWOD drive electrode is programmed high, a voltage $V_1$ is applied to the EW drive electrode. $V_1$ is a square waveform of amplitude $2V_A$, high level $+V_A$ and low level $-V_A$. In the case where the frequency of the AC waveform is below the characteristic droplet response frequencies (as determined by the droplet conductivity), the electrowetting voltage $V_{EW}$ is given by the root mean square (rms) value of the voltage difference between $V_1$ and $V_T$, equal to $V_A$.

There are several advantages of implementing EWOD with an AC drive scheme. These advantages include:
  Reduced device degradation through life
  Improved insulator reliability
  Improved droplet dynamics For these reasons most groups working on EWOD use AC drive schemes with drive frequencies of typically 10 kHz or higher.

Many modern liquid crystal (LC) displays use an Active Matrix (AM) arrangement whereby thin-film transistors control the voltage maintained across the liquid crystal layer.

LC displays generally require that the voltage across the liquid crystal should be alternated ("inversion") since the application of a DC field has deleterious effects for the LC material. Most LC inversion schemes operate so as to invert the sign of the applied LC voltage with each frame of information written to the display. This is typically a frequency of 50-60 Hz.

"Ultra-Low Power System-LCD with Pixel Memory Circuit", Matsuda et al., Proceedings of IDW '09, AMD1-2, describes an LCD with a pixel memory driving scheme. Pixel memory refers to a technology whereby the data written to the display is held by an SRAM memory cell within the pixel. The display is thus 1-bit, i.e. it can only display black or white and not intermediate grey levels. The advantage of such an implementation is that it removes the requirement to periodically refresh the voltage written to the display and thus reduces power consumption. In order to effect inversion of the voltage across the LC layer, an additional inversion circuit is also included in pixel. This enables the inversion frequency to be higher than the data refresh rate of the display.

U.S. Pat. No. 7,163,612 (J. Sterling et al.; issued Jan. 16, 2007) describes how TFT based electronics may be used to control the addressing of voltage pulses to an EWOD array by using circuit arrangements very similar to those employed in AM display technologies.

Such an approach may be termed "Active Matrix Electrowetting on Dielectric" (AM-EWOD). There are several advantages in using TFT based electronics to control an EWOD array, namely:
  Driver circuits can be integrated onto the AM-EWOD array substrate.
  TFT-based electronics are well suited to the AM-EWOD application. They are cheap to produce so that relatively large substrate areas can be produced at relatively low cost
  TFTs fabricated in standard processes can be designed to operate at much higher voltages than transistors fabricated in standard CMOS processes. This is significant since many EWOD technologies require EWOD actuation voltages in excess of 20V to be applied.

A disadvantage of U.S. Pat. No. 7,163,612 (J. Sterling et al.; issued Jan. 16, 2007) is that it does not disclose any circuit embodiments for realising the TFT backplane of the AM-EWOD. This patent also specifies use of a ground plane on the top substrate. This has the disadvantage that the voltages switched by the TFTs must be at least equal to the electrowetting drive voltage.

In some cases however, the EWOD actuation voltage may still exceed the maximum voltage rating of the TFTs. High voltage operation of TFTs may result in device degradation or failure as is well known.

A further disadvantage of the high operating voltage is that power consumption from operating the switches (due to the charging and discharging of the parasitic switch capacitance) may also be significant. This power consumption scales with the square of the voltage amplitude.

An alternative technology for implementing droplet microfluidics is dielectrophoresis. Dielectrophoresis is a phenomenon whereby a force may be exerted on a dielectric particle by subjecting it to a varying electric field. "Integrated circuit/microfluidic chip to programmably trap and move cells and droplets with dielectrophoresis", Thomas P Hunt et al, Lab Chip, 2008, 8, 81-87 describes a silicon integrated circuit (IC) backplane to drive a dielectrophoresis array for digital microfluidics. This reference describes an integrated circuit for driving AC waveforms to array elements, shown FIG. 2. The circuit consists of a standard SRAM memory cell 104 to which data can be written and stored, switch circuitry 106, and an output buffer stage 108. According to the operation of the switches 110 and 112 either the AC signal Vpix (shown as a 5V 1 MHz square wave in this example) or complementary signal $\overline{\text{Vpix}}$ is written to the pixel. Unlike in the case of an EWOD array, the dielectrophoresis system does not require a top substrate. Furthermore, unlike EWOD such a dielectrophoresis system can operate with relatively low drive voltages, typically 5V. This is compatible with typical operating voltages for silicon ICs and TFTs used in displays.

SUMMARY OF INVENTION

A basic aspect of the invention is an AM-EWOD having an AC drive scheme whereby:
Data written to the EW drive electrode is arranged to be either:
  1. a time-varying voltage waveform $V_1$ of amplitude $V_B$ and period $t_0$ or
  2. a time-varying voltage waveform $V_2$, the logical inverse of $V_1$ The top substrate electrode is driven by the time-varying waveform $V_2$ In operation the applied electrowetting voltage $V_{EW}=V_1-V_2$ is then either:
  1. A time-varying waveform having high level $V_B$, low level $-V_B$ and period $t_0$ or
  2. 0V In the most general case it is also be possible for the top substrate electrode to be driven by a time-varying waveform $V_3$ which is the waveform $V_2$ offset by a voltage level $V_{offset}$ which may in principle have either or both of an AC or DC component. An advantageous situation is where the high level of $V_3$ is increased by a voltage $V_C$ and the low level is decreased by $V_C$.

In this case the applied electrowetting voltage $V_{EW}=V_1-V_2$ is then either:
  1. A time-varying waveform having high level $V_C+V_B$, low level $-(V_C+V_B)$ and period $t_0$ or
  2. $V_C$ The advantages of the invention are as follows:
  The maximum voltage required to be switched by the control transistors (e.g. TFTs) is equal to the applied electrowetting voltage. This is important since in many cases the electrowetting drive voltage may exceed the maximum operating voltage rating of the TFTs fabricated according to standard processing and design rules. Thus for a given maximum TFT voltage, the EW drive voltage that can be applied is 2× bigger than for standard AM-EWOD with a DC drive scheme.
  The frequency of the AC waveform applied across the droplet can be made relatively high, and typically much higher than the frame write frequency of the AM-EWOD. Therefore the AM-EWOD can benefit from the advantages of high frequency AC drive already discussed in prior art and namely:
  Improved insulator reliability
  Reduced degradation during operation
  Improved droplet dynamics
  Reducing the voltage switched by the TFT elements to the EW drive voltage also reduces the dynamic power consumption of the device in comparison to the AC drive scheme whereby the voltage of the top substrate is maintained at a constant potential.

According to an aspect of the invention, an active matrix electrowetting on dielectric (AM-EWOD) device is provided which includes a plurality of array elements configured to manipulate one or more droplets of fluid on an array, each of the array elements including a corresponding array element circuit. Each array element circuit includes a top substrate electrode and a drive electrode between which the one or more droplets may be positioned; circuitry configured to write data to the corresponding array element by selectively applying to the drive electrode either: (i) a time-varying voltage waveform $V_1$ of amplitude $V_B$ and period $t_0$; or (ii) a time-varying voltage waveform $V_2$, the logical inverse of $V_1$, and applying to the top substrate electrode the time-varying voltage waveform $V_2+V_{offset}$, where $V_{offset}$ represents an offset voltage signal which may have AC and/or DC components and may equal zero.

In accordance with another aspect of the invention, $V_{offset}$ equals zero.

According to another aspect, $V_{offset}$ is non-zero.

According to yet another aspect, $V_1$ and $V_2$ are square wave voltage pulses.

According to still another aspect, $V_{offset}$ is a square wave voltage in phase with the square wave voltage pulse $V_2$ and having a maximum amplitude of $V_c$ and a minimum amplitude of $-V_c$ with period $t_0$.

In accordance with yet another aspect, the value of $V_c$ satisfies the following expression:

$$\cos(\theta_{sat}) \approx \cos(\theta_0) + \frac{C(V_B+V_C)^2}{2Y_{LG}}$$

where $\theta_{sat}$ represents a saturation contact angle of the one or more droplets within the array element, $\theta_0$ is a contact angle of the one or more droplets for zero voltage, C is an insulator capacitance within the array element, and $Y_{LG}$ is a surface tension associated with an interface between the one or more droplets and surrounding non-ionic liquid within the array element.

According to another aspect, $V_1$ and $V_2$ are at least one of sinusoidal, triangular or sawtooth in shape.

According to still another aspect, the plurality of array elements share a common top substrate electrode.

In accordance with another aspect, the waveform $V_1$ is common to the plurality of array elements.

In accordance with still another aspect, the waveform $V_2$ is common to the plurality of array elements.

According to yet another aspect, each array element circuit includes an inversion circuit which applies the waveform $V_2$ to the drive electrode by selectively inverting the waveform $V_1$ as a function of data written to the array element.

According to another aspect, each array element circuit includes a memory function for storing the data to be written to the array element.

In yet another aspect, the memory function comprises a DRAM circuit.

In still another aspect, the memory function comprises an SRAM circuit.

According to another aspect, the SRAM circuit includes a plurality of analog switches.

In accordance with another aspect, the circuitry is configured to alternate between AC mode operation and DC mode operation, such that during AC mode operation the circuitry writes data to the corresponding array element by selectively applying to the drive electrode either (i) the waveform $V_1$ of amplitude $V_B$ and period $t_0$; or (ii) the waveform $V_2$, and applying to the top substrate electrode the waveform $V_2+V_{offset}$, and during DC mode operation the circuitry holds the drive electrode and the top substrate electrode at constant potentials.

According to another aspect, polarities of the constant potentials at the drive electrode and the top substrate electrode during DC mode operation are opposite.

In yet another aspect, the polarities of the constant potentials alternate between frames of DC mode operation.

In accordance with still another aspect, a method is provided for driving an active matrix electrowetting on dielectric (AM-EWOD) device including a plurality of array elements configured to manipulate one or more droplets of fluid on an array, each of the array elements including a top substrate electrode and a drive electrode between which the one or more droplets may be positioned. The method includes selectively applying to the drive electrode either (i) a time-varying voltage waveform $V_1$ of amplitude $V_B$ and period $t_0$; or (ii) a time-varying voltage waveform $V_2$, the logical inverse of $V_1$, and applying to the top substrate electrode the time-varying voltage waveform $V_2+V_{offset}$, where $V_{offset}$ represents an offset voltage signal which may have AC and/or DC components and may equal zero.

According to another aspect, $V_{offset}$ equals zero.

According to still another aspect, $V_{offset}$ is non-zero.

In accordance with another aspect, $V_1$ and $V_2$ are square wave voltage pulses.

According to another aspect, $V_{offset}$ is a square wave voltage in phase with the square wave voltage pulse $V_2$ and having a maximum amplitude of $V_c$ and a minimum amplitude of $-V_c$ with period $t_0$.

According to still another aspect, the value of $V_c$ satisfies the following expression:

$$\cos(\theta_{sat}) \approx \cos(\theta_0) + \frac{C(V_B + V_C)^2}{2Y_{LG}}$$

where $\theta_{sat}$ represents a saturation contact angle of the one or more droplets within the array element, $\theta_0$ is a contact angle of the one or more droplets for zero voltage, C is an insulator capacitance within the array element, and $Y_{LG}$ is a surface tension associated with an interface between the one or more droplets and surrounding non-ionic liquid within the array element.

According to another aspect, $V_1$ and $V_2$ are at least one of sinusoidal, triangular or sawtooth in shape.

In yet another aspect, the method includes the step of alternating between AC mode operation and DC mode operation, wherein during AC mode operation data is written to the corresponding array element by selectively applying to the drive electrode either (i) the waveform $V_1$ of amplitude $V_B$ and period $t_0$; or (ii) the waveform $V_2$, and applying to the top substrate electrode the waveform $V_2+V_{offset}$, and during DC mode operation holding the drive electrode and the top substrate electrode at constant potentials.

According to yet another aspect, polarities of the constant potentials at the drive electrode and the top substrate electrode during DC mode operation are opposite.

In accordance with still another aspect, the polarities of the constant potentials alternate between frames of DC mode operation.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

Figure 1:
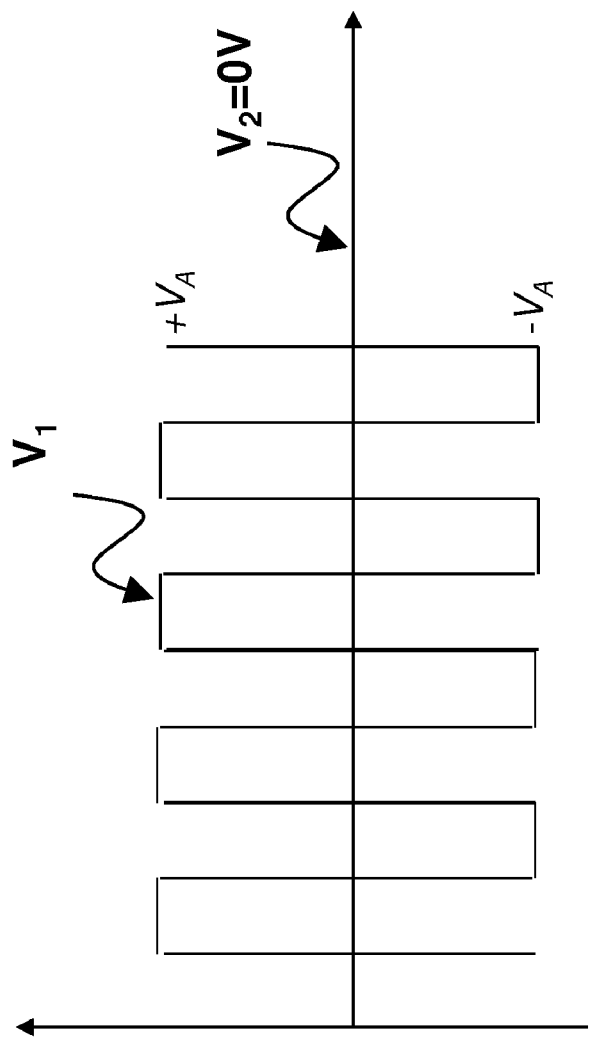
FIG. 1 shows prior art: an AC drive scheme for an EWOD device.
Figure 2:
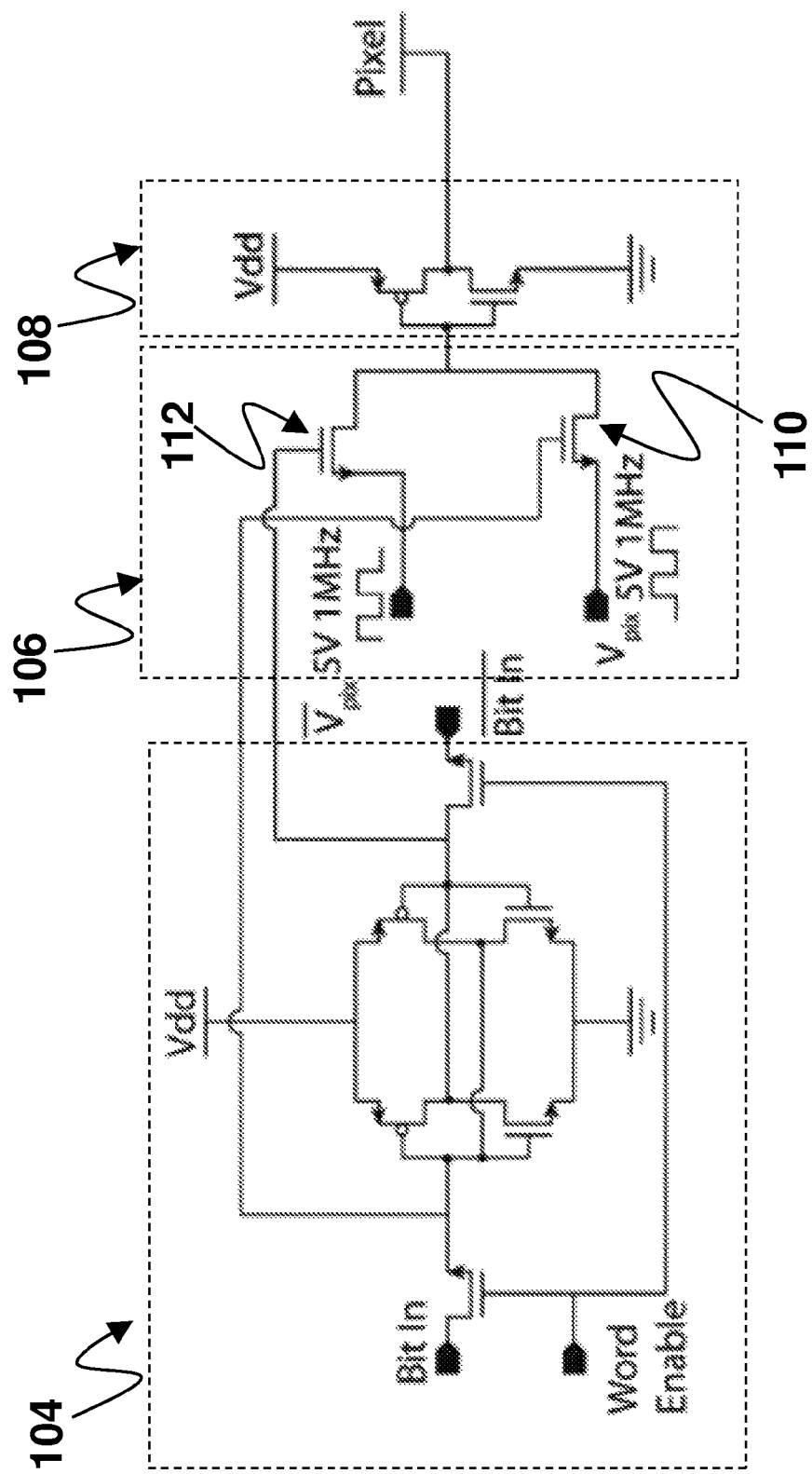
FIG. 2 shows prior art: the array element circuit of a backplane for control of droplets by dielectrophoresis.

| DESCRIPTION OF REFERENCE NUMERALS | |
|---|---|
| 4 | liquid droplet |
| 6 | contact angle θ |
| 16 | Hydrophobic surface |
| 20 | Insulator layer |
| 26 | Hydrophobic layer |
| 28 | Electrode |
| 32 | Spacer |
| 34 | Non-ionic liquid |
| 36 | Top substrate |
| 38 | Electrode |
| 42 | Electrode array |
| 72 | Substrate |
| 74 | Thin film electronics |
| 76 | Row driver circuit |
| 78 | Column driver circuit |
| 80 | Serial interface |
| 82 | Connecting wires |
| 84 | Array element circuit |
| 104 | SRAM memory cell |
| 106 | Switch circuitry |
| 108 | Output buffer stage |
| 110 | Switch transistor |
| 112 | Switch transistor |

-continued

DESCRIPTION OF REFERENCE NUMERALS

| | |
|---|---|
| 203 | Storage capacitor |
| 206 | Switch transistor |
| 210 | Memory node |
| 212 | Inverter |
| 214 | First analogue switch |
| 216 | Second analogue switch |
| 226 | First inverter |
| 228 | Second inverter |
| 230 | Switch transistor |
| 240 | Analogue switch |
| 242 | Analogue switch |

DETAILED DESCRIPTION OF INVENTION

Figure 3:
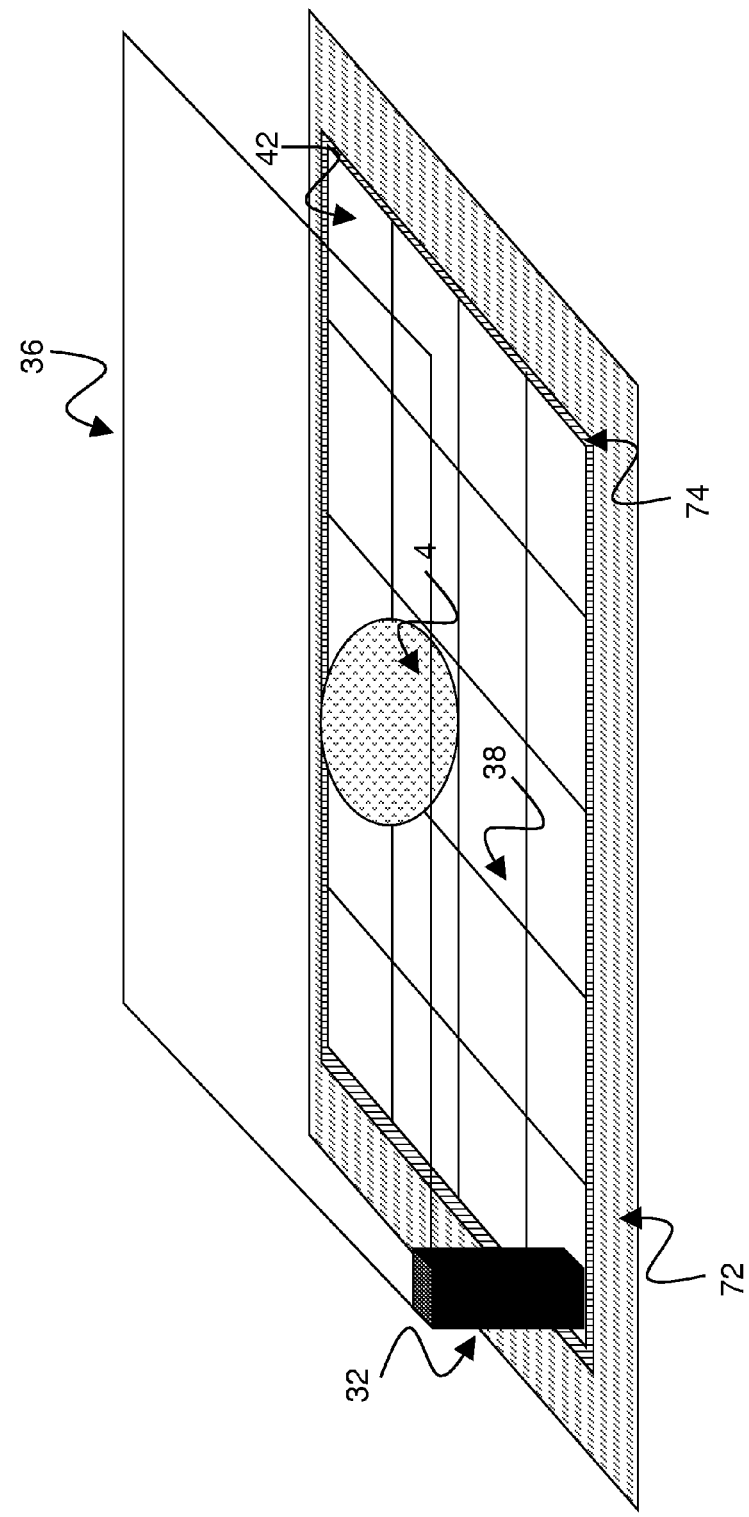
FIG. 3 shows an AM-EWOD device in schematic perspective in accordance with an exemplary embodiment of the invention.

Referring to FIG. 3, shown is an AM-EWOD device in accordance with an exemplary embodiment of the present invention. The AM-EWOD device has a lower substrate 72 with thin film electronics 74 disposed upon the substrate 72. The thin film electronics 74 are arranged to drive array element electrodes, e.g. 38. A plurality of array element electrodes 38 are arranged in an electrode array 42, having M×N elements where M and N may be any number. An EWOD liquid droplet 4 is enclosed between the substrate 72 and the top substrate 36, although it will be appreciated that multiple droplets 4 can be present without departing from the scope of the invention.

Figure 4:
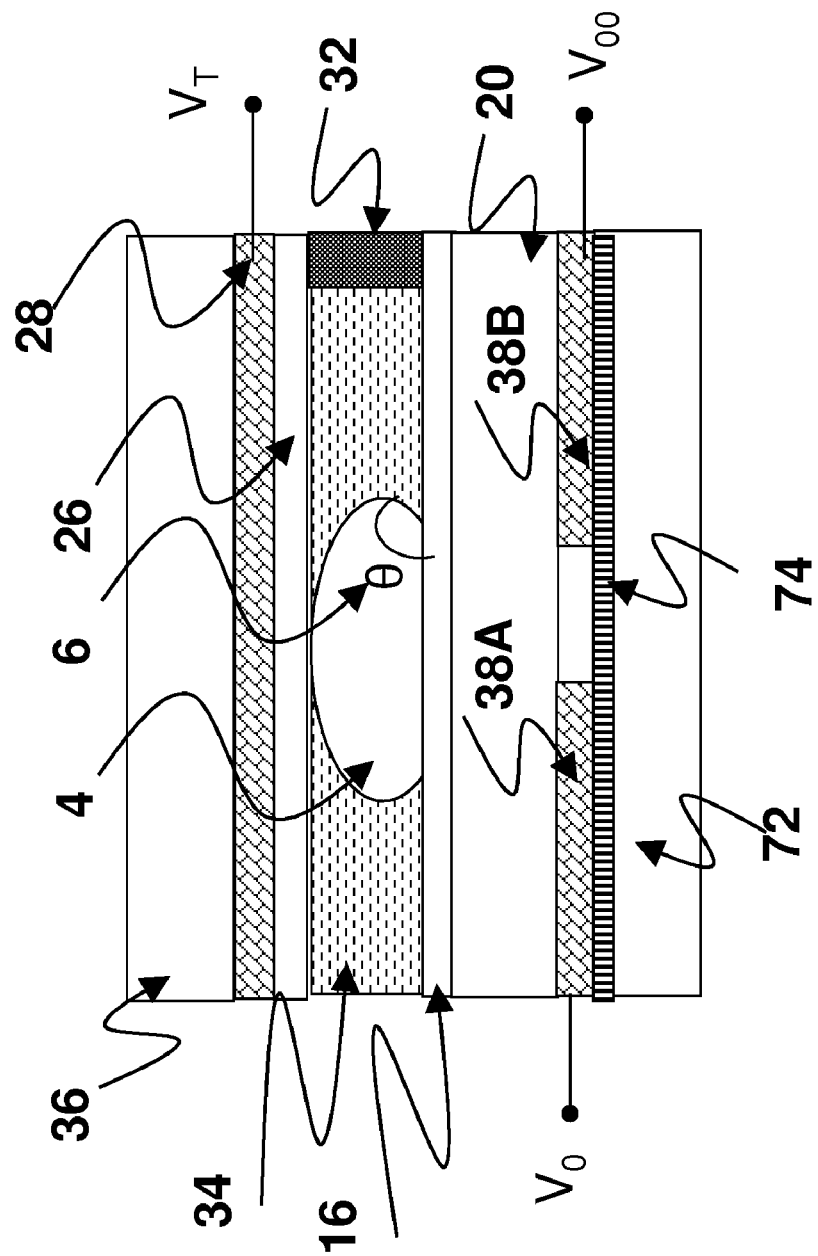
FIG. 4 shows a cross section through some of the array elements of the device.

FIG. 4 shows a pair of the array elements in cross section. The device includes the lower substrate 72 having the thin-film electronics 74 disposed thereon. The uppermost layer of the lower substrate 72 (which may be considered a part of the thin film electronics layer 74) is patterned so that a plurality of electrodes 38 (e.g., 38A and 38B in FIG. 4) are realised. These may be termed the EW drive elements. The term EW drive element may be taken in what follows to refer both to the electrode 38 associated with a particular array element, and also to the node of an electrical circuit directly connected to this electrode 38. The droplet 4, consisting of an ionic material is constrained in a plane between the lower substrate 72 and the top substrate 36. A suitable gap between the two substrates may be realised by means of a spacer 32, and a non-ionic liquid 34 (e.g. oil) may be used to occupy the volume not occupied by the droplet 4. An insulator layer 20 disposed upon the lower substrate 72 separates the conductive electrodes 38A, 38B from the hydrophobic surface 16 upon which the droplet 4 sits with a contact angle 6 represented by θ. On the top substrate 36 is another hydrophobic layer 26 with which the droplet 4 may come into contact. Interposed between the top substrate 36 and the hydrophobic layer 26 is a top substrate electrode 28. By appropriate design and operation of the thin film electronics 74, different voltages, termed the EW drive voltages, (e.g. $V_T$, $V_O$ and $V_{OO}$) may be applied to different electrodes (e.g. drive element electrodes 28, 38A and 38B, respectively). The hydrophobicity of the hydrophobic surface 16 can be thus be controlled, thus facilitating droplet movement in the lateral plane between the two substrates 72 and 36.

Figure 5:
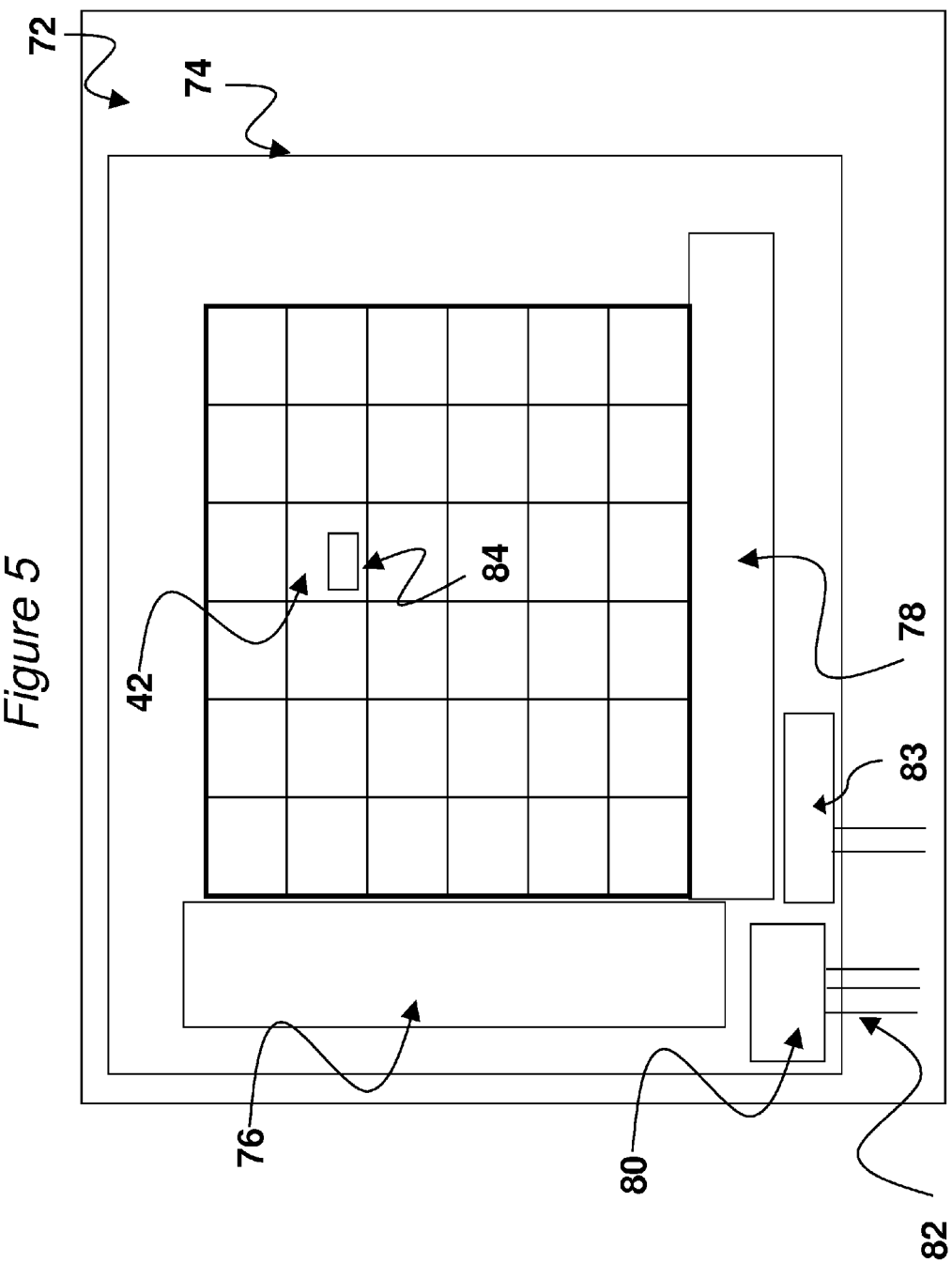
FIG. 5 shows the arrangement of thin film electronics in the device.

The arrangement of thin film electronics 74 upon the substrate 72 is shown in FIG. 5. Each element of the electrode array 42 contains an array element circuit 84 for controlling the electrode potential of a corresponding electrode 38. Integrated row driver 76 and column driver 78 circuits are also implemented in thin film electronics to supply control signals to the array element circuits 84. A serial interface 80 may also be provided to process a serial input data stream and write the required voltages to the electrode array 42. A voltage supply interface 83 provides the corresponding supply voltages, top substrate drive voltages, etc., as described herein. The number of connecting wires 82 between the array substrate 72 and external drive electronics, power supplies etc. can be made relatively few, even for large array sizes.

Figure 6:
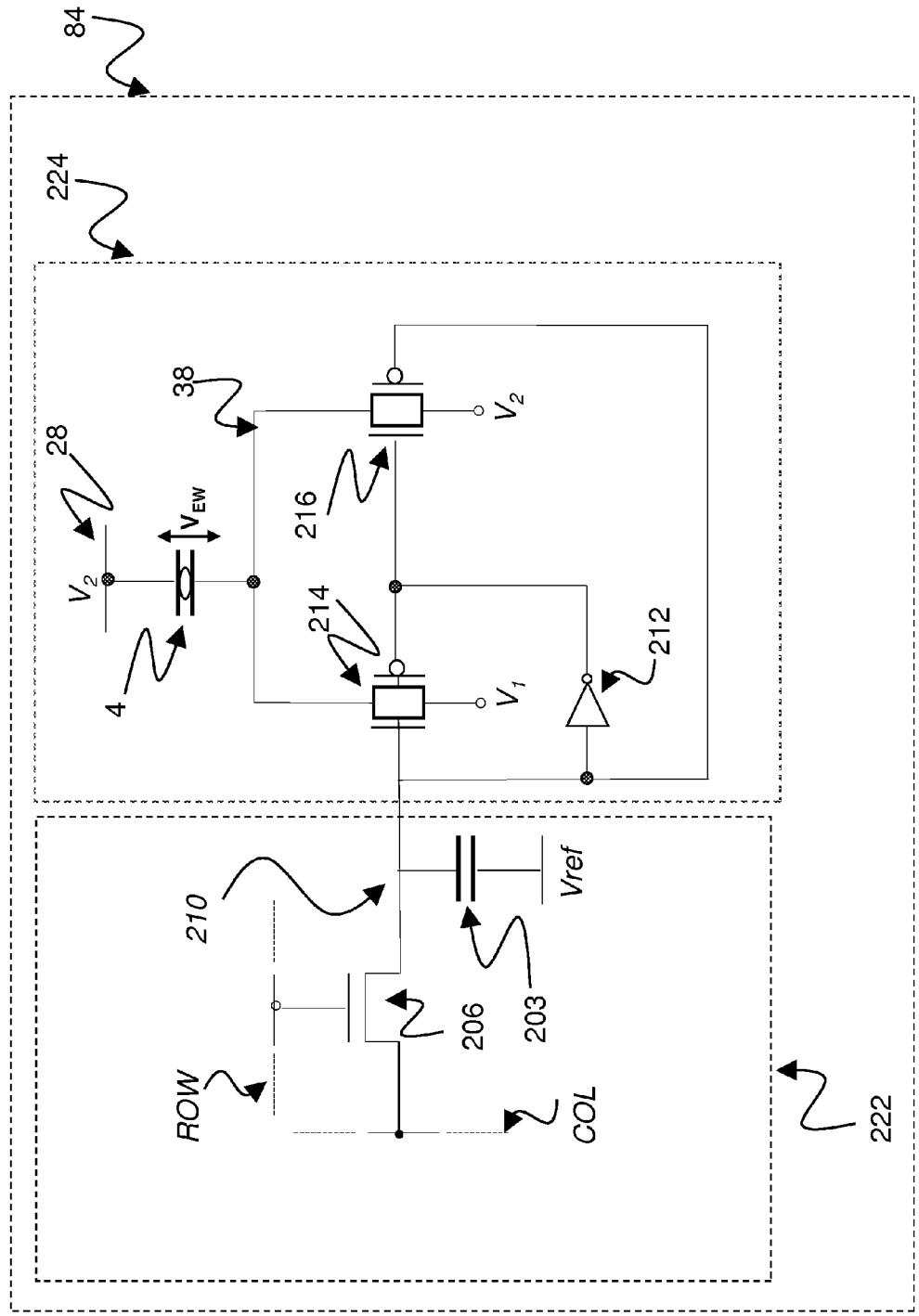
FIG. 6 shows the array element circuit of the first embodiment.

The array element circuit 84 according to a first embodiment is shown in FIG. 6. The remainder of the AM-EWOD device is of the standard construction previously described and includes a top substrate 36 having an electrode 28.

Each array element circuit 84 is arranged so as to supply the electrowetting drive voltage $V_{EW}$ across the liquid droplet 4 and includes the following components:

A memory function 222 comprising:
    A column write line COL (originating from the column driver 78), which may be common to array elements within the same column
    A row select line ROW (originating from the row driver 76), which may be common to array elements within the same row
    A storage capacitor 203
    A DC supply voltage Vref
    A switch transistor 206

An inversion circuit 224 comprising:
    A first analogue switch 214
    A second analogue switch 216
    A supply voltage $V_1$, which may be common to all elements within the array
    A second supply voltage $V_2$, which may be common to all elements within the array
    An inverter 212

The array element circuit 84 is connected as follows:

The column write line COL is connected to the source of the switch transistor 206. The row select line ROW is connected to the gate of the switch transistor 206. The storage capacitor 203 is connected between the DC supply voltage Vref and the drain of the switch transistor 206. The drain of the switch transistor 206 is connected to the input of the inverter 212, the gate of the n-type transistor of the first analogue switch 214 and the gate of the p-type transistor of the second analogue switch 216. The output of the inverter 212 is connected to the gate of the p-type transistor of the first analogue switch 214 and to the gate of the n-type transistor of the second analogue switch 216. The supply voltage $V_1$ is connected to the input of the first analogue switch 214. The supply voltage $V_2$ is connected to the input of the second analogue switch 216. The outputs of the first analogue switch 214 and the second analogue switch 216 are each connected to the conductive electrode 38 forming the EW drive electrode.

The operation of the array element circuit 84 is described as follows:

The array element circuit 84 includes the aforementioned two functional blocks, the memory function 222 and the inversion circuit 224. The memory function 222 is a standard DRAM circuit. A digital voltage $V_{WRITE}$ corresponding to either logic "0" or logic "1" state may be written to the memory by loading the column write line COL with the required voltage and then applying a high level voltage pulse to the row select line ROW. This turns on the switch transistor 206 and the write voltage is then written to the memory node 210 and stored across the storage capacitor 203. Due to leakage of the switch transistor 206, the memory must be re-written periodically so as to refresh the voltage at the memory node 210.

In the case where logic "1" state is written to the memory function 222, the inversion circuit 224 becomes configured such that the first analogue switch 214 is turned on, and the second analogue switch 216 is turned off. As a result supply voltage $V_1$ is applied to the conductive electrode 38 forming the EW drive electrode. In the case where logic "0" state is written is written to the memory function 222, the inversion circuit 224 becomes configured such that the first analogue switch 214 is turned off, and the second analogue switch 216 is turned on. In this case supply voltage $V_2$ is applied to the conductive electrode 38 forming the EW drive electrode. The supply voltage $V_2$ is also applied to the electrode 28 of the top substrate. As a result, the electrowetting voltage $V_{EW}$ maintained across the droplet 4 is either:

0, in the case where logic "0" is written to the memory.

$V_1-V_2$, in the case where logic "1" is written to the memory

Figure 7:
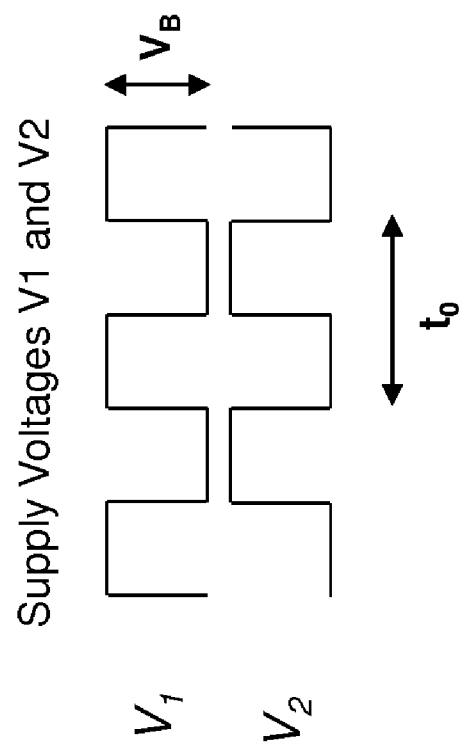
FIG. 7 shows the voltage waveforms according to the first embodiment of the invention.

FIG. 7 shows the time dependence of the waveforms of supply voltage $V_1$ and supply voltage $V_2$ according to this embodiment. $V_1$ is a square wave of amplitude $V_B$ and period $t_0$, and supply voltage $V_2$ is the logical inverse of $V_1$.

Therefore in the case where logic "1" is written to the memory, the electrowetting voltage $V_{EW}$ (i.e., $V_1-V_2$) is a square wave of rms amplitude $V_B$.

Advantages of this embodiment as previously described are:

The maximum voltage switched by the TFTs making up analogue switches 214 and 216 is equal to the electrowetting voltage. For a given maximum voltage rating for the TFTs, this facilitates a higher electrowetting voltage than would be possible in the case of AC operation where the top electrode 28 was maintained at constant potential.

High frequency AC mode operation of the AM-EWOD is possible, with various associated advantages including An AC drive scheme can facilitate improved insulator reliability. Under the action of a DC field, ions in the droplet 4 have a tendency to migrate through the insulator layer dielectrics at defect sites, giving rise to pin-holing of the device. This can result in device failure. At high AC frequencies devices are less susceptible to this method of breakdown since the mobile ions are subjected to an oscillating rather than a DC field.

EWOD devices operated with a DC drive scheme have been observed to suffer from degraded performance through operating lifetime, a phenomenon whereby droplet motion becomes increasingly sluggish over time. This effect is not yet fully understood but has been postulated to be due to polarisation of the insulator and/or hydrophobic layers. Operating with an AC drive scheme avoids this effect since the insulator and hydrophobic layers are not subject to a DC electric field An AC drive scheme may facilitate improved droplet dynamics for operations such as transport, mixing etc, although the reasons for this are not fully understood.

The dynamic power consumption is reduced as a consequence of reduced TFT voltages Further advantages of this embodiment are:

The circuit for implementing AC mode operation required only seven active components (TFTs) thus achieving a small layout footprint and facilitating high yield/manufacturability The AC drive signals $V_1$ and $V_2$ are global connections to all elements in the array. $V_1$ and $V_2$ can thus be driven directly from off-chip by a suitable IC buffer circuit of low output impedance. This may facilitate high frequency AC operation.

It will be obvious to one skilled in the art that a number of small modifications to this embodiment are possible, for example the voltage $V_1$ could be applied to the electrode 28 of the top substrate instead of voltage $V_2$. In this case the operation of the circuit would be very similar to as described above except that writing logic "1" to the memory function in this case would apply 0V across the droplet and writing logic "0" to the memory would apply the square wave waveform across the droplet. Similarly the connections of $V_1$ and $V_2$ in the circuit could also be interchanged.

As will be appreciated, the present invention is described herein primarily in the context of embodiments in which the supply voltages $V_1$ and $V_2$ are square waves, also referred to herein as square wave voltage pulses $V_1$ and $V_2$. However, the present invention also includes utilizing other shaped time-varying waveforms such as sinusoidal waveforms, triangular waveforms, sawtooth waveforms, etc. In the broadest sense the present invention is not intended to be limited to a particular shape of waveform.

For example, it will be apparent to one skilled in the art that the above described embodiment could be implemented with non-square wave voltage pulses applied to $V_1$ and $V_2$. For example the embodiment could be implemented with sinusoidal voltages such that $$V_1 = V_B \sin(wt)$$

$$V_2 = -V_B \sin(wt)$$

In this case the electrowetting voltage $V_{EW}$ (i.e., $V_1-V_2$) is given by $$V_{EW} = [V_B \sin(wt)]^2$$

The time-averaged electrowetting voltage would then be $V_B^2/\sqrt{2}$.

Figure 8:
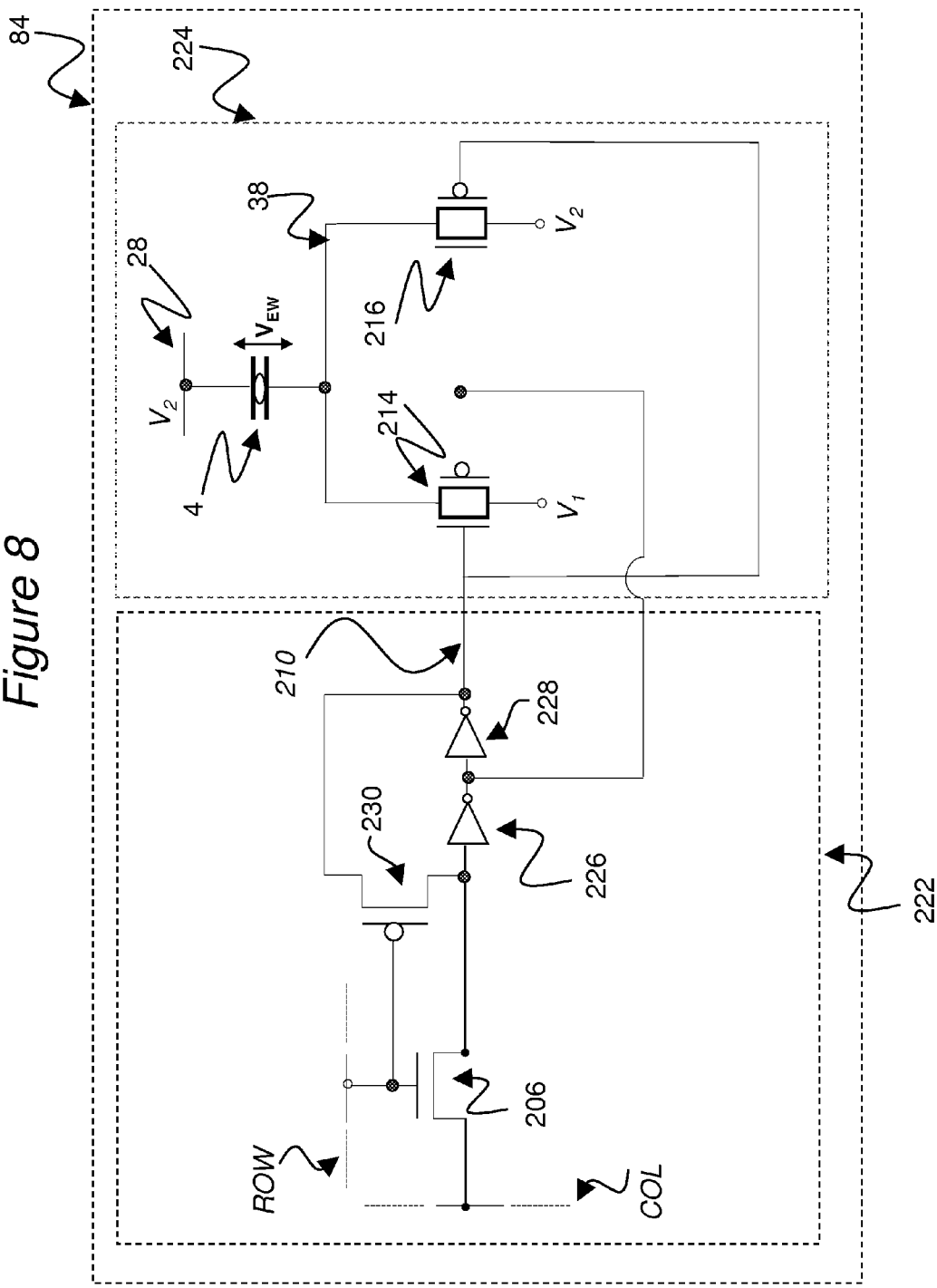
FIG. 8 shows an array element circuit in accordance with a second embodiment of the invention.

The AM-EWOD device according to a second embodiment is as the first embodiment with an alternative array element circuit 84. The array element circuit 84 of this embodiment is shown in FIG. 8. In this embodiment the memory function 222 is comprised of an SRAM cell.

The array element circuit 84 in this embodiment contains the following elements:

A memory function 222 comprising:
  A column write line COL (originating from the column driver 78), which may be common to array elements within the same column
  A row select line ROW (originating from the row driver 76), which may be common to array elements within the same row
  An n-type switch transistor 206
  A p-type switch transistor 230
  A first inverter 226
  A second inverter 228
An inversion circuit 224 comprising:
  A first analogue switch 214
  A second analogue switch 216
  A voltage supply $V_1$, which may be common to all elements within the array
  A second voltage $V_2$, which may be common to all elements within the array The circuit is connected as follows:

The column write line COL is connected to the source of the switch transistor 206. The row select line ROW is connected to the gate of the switch transistor 206 and the gate of the switch transistor 230. The drain of the switch transistor 230 is connected to the drain of the switch transistor 206 and to the input of the first inverter 226. The output of the first inverter 226 is connected to the input of the second inverter 228, the gate of the p-type transistor of the first analogue switch 214 and the gate of the n-type transistor of the second analogue switch 216. The output of the second inverter 228 is connected to the gate of the n-type transistor of the first analogue switch 214 and to the gate of the p-type transistor of the second analogue switch 216 and to the source of the switch transistor 230. The voltage supply $V_1$ is connected to the input of the first analogue switch 214. The voltage $V_2$ is connected to the input of the second analogue switch 216. The outputs of the first analogue switch 214 and the second analogue switch 216 are each connected to the conductive electrode 38 forming the EW drive electrode.

The operation of this embodiment is similar to the first embodiment. The memory function is written by applying a high voltage pulse to the row select line ROW so as to turn the switch transistors 206 and 230 on. The voltage on the column write line COL is then written to the memory node 210. The operation of the inversion circuit 224 is as described for the first embodiment, with the exception that the inverted memory node signal can be obtained from connection to the node between the two inverters 226,228 of the SRAM cell.

An advantage of this embodiment is that the SRAM memory function 222 does not require continual refresh. This may facilitate device operation with lower power consumption than is possible with a DRAM memory function. The array element circuit 84 is implemented with a minimal number of active components (ten TFTs) thus minimizing layout footprint and maximizing manufacturing yield.

Figure 9:
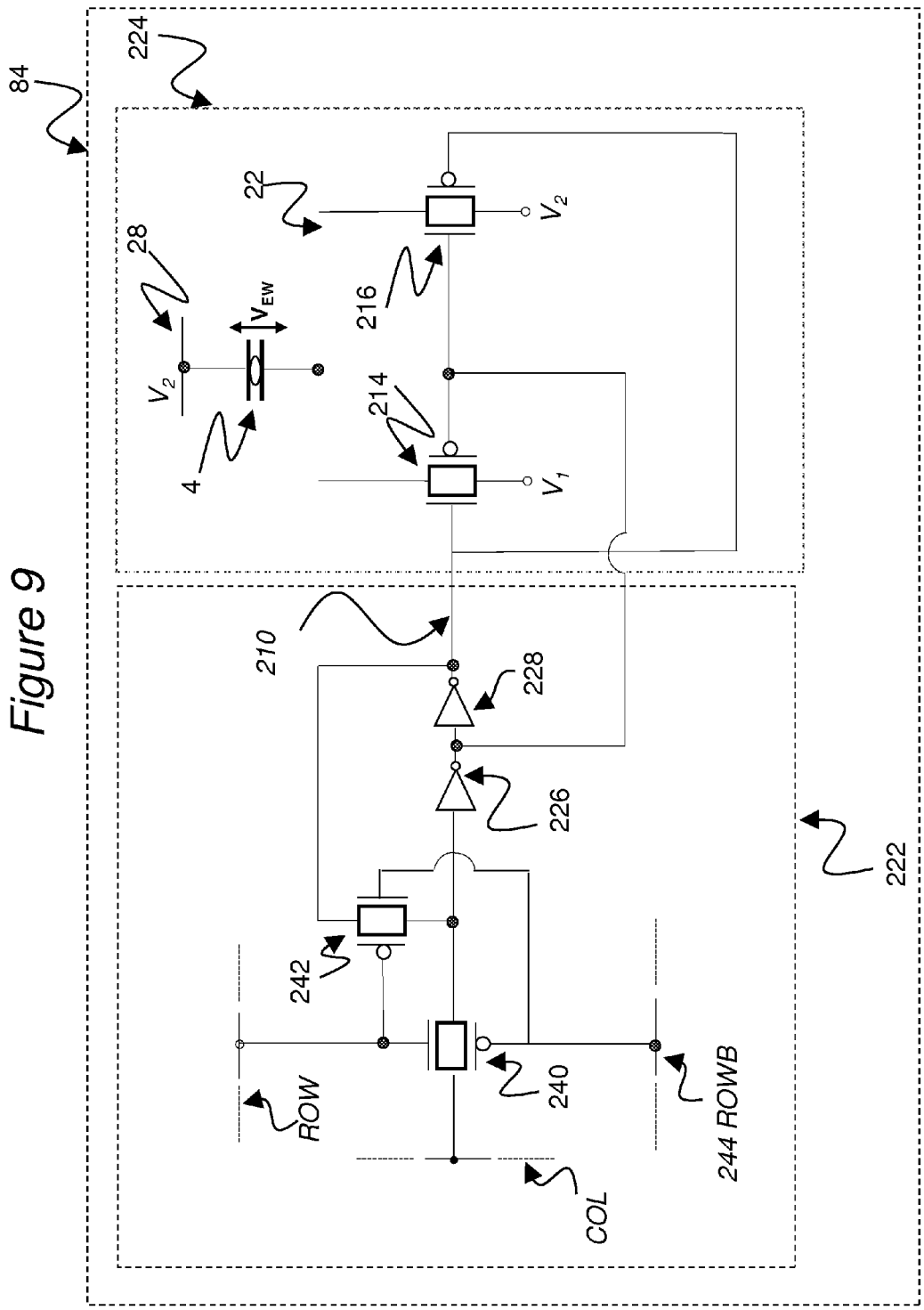
FIG. 9 shows an array element circuit in accordance with a third embodiment of the invention.

The third embodiment is shown in FIG. 9. This embodiment is as the second embodiment of FIG. 8 except that the switch transistors 206 and 230 have each been replaced by analogue switches 240 and 242. The ROW connection is connected to the n-type transistor gate of analogue switch 240 and to the p-type transistor gate of analogue switch 242. An additional connection ROWB is supplied common to each array element within the same row. This is driven by the inverse signal of ROW and also is provided by the row driver 76. The n-type transistor gate of analogue switch 242 and the p-type transistor gate of analogue switch 240 are connected to ROWB.

The operation of this embodiment is as described for the second embodiment. This embodiment has the additional advantage that by replacing the single SRAM switch transistors 206,230 by analogue switches 240,242, problems due to threshold voltage drop in the SRAM cell may be avoided.

According to a fourth embodiment of the present invention, the AM-EWOD device is that of any of the previous embodiments with the exception of a modified driving method whereby the AC voltage signal applied to the electrode 28 of the top substrate 36 has an increased amplitude.

Figure 10:
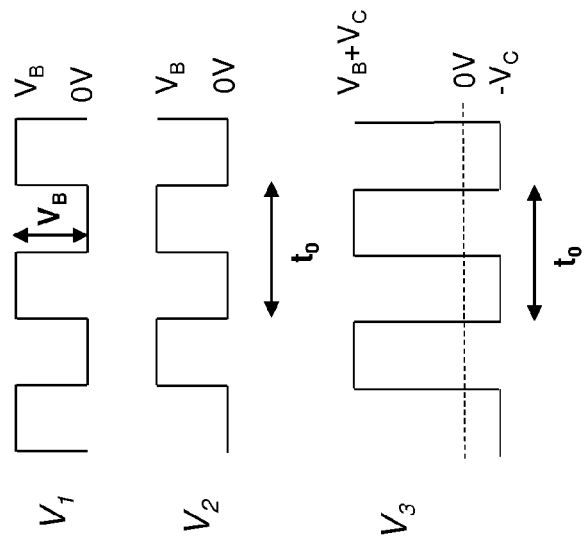
FIG. 10 shows the voltage waveforms according to a fourth embodiment of the invention.

Specifically the array element circuit 84, realised in thin-film electronics 74 on the lower substrate 72, is arranged to switch either supply voltage $V_1$ or supply voltage $V_2$ to the EW drive electrode 38 as described for the previous embodiments. Referring to FIG. 10:

Supply voltage $V_1$ consists of a square wave voltage pulse of amplitude $V_B$ and period $t_0$. For convenience of description in what follows we may define $V_1$ as having low level 0V, and high level $V_B$.

Supply voltage $V_2$ is the logical inverse of $V_1$, i.e., consists of a square wave voltage pulse of amplitude $V_B$ and period $t_0$. The low level of $V_2$ is 0V, the high level $V_B$, and $V_2$ is in anti-phase to $V_1$.

A supply voltage $V_3$ is applied to the electrode 28 of the top substrate 36 as follows:

Supply voltage $V_3$ consists of a square wave voltage pulse represented by $V_2+V_{offset}$. In the previous embodiments, $V_{offset}$ has been equal to zero. In this particular example, $V_{offset}$ is non-zero and is a square wave voltage in phase with $V_2$ and having a maximum amplitude of $V_c$ and a minimum amplitude of $-V_c$ with period $t_0$. As a result, the supply voltage $V_3$ has an amplitude $V_B+2V_C$ and period $t_0$. The low level of $V_3$ is $-V_C$ and the high level $V_B+V_C$.

FIG. 10 shows the time dependence and amplitudes of waveforms $V_1$, $V_2$ and $V_3$.

The advantage of this embodiment is that by increasing the amplitude of the signal $V_3$ ($=V_2+V_{offset}$) applied to the electrode 28 of the top substrate 36, the difference in energy between the actuated and non-actuated states of the droplet 4 can be maximized whilst having the same voltage ($V_B$) switched by the TFTs as for the previous embodiments. The dependence of the contact angle θ of the droplet 4 on the applied electrowetting voltage $V_{EW}$ is described by the Lippmann-Young equation:

$$\cos(\theta) = \cos(\theta_0) + \frac{CV_{EW}^2}{2Y_{LG}} \quad \text{(equation 1)}$$

Where $\theta_0$ is the contact angle for zero voltage, C is the insulator capacitance and $Y_{LG}$ is the surface tension associated with the interface between the liquid droplet 4 and the surrounding non-ionic liquid 34.

The surface energy associated with actuation is approximately proportional to $\cos(\theta)$. Therefore it is desirable to maximize the difference in energy between the "1" and "0" states written to an array element.

In the case of a "0" being written to an AM-EWOD drive electrode 38, the magnitude of the voltage difference between the electrode 38 and the electrode 28 of the top substrate is equal to $V_B+V_C$ (the sign of this voltage changes each half cycle of the waveform but the amplitude is maintained constant). The contact angle is thus given by $$\cos(\theta) = \cos(\theta_0) + \frac{CV_C^2}{2Y_{LG}} \quad \text{(equation 2)}$$

In the case of a "1" being written to an AM-EWOD drive electrode 38, the magnitude of the voltage difference between the electrode 38 and the electrode 28 of the top substrate is equal to $V_C$ (as above the sign of this voltage changes each half cycle of the waveform but the amplitude is maintained constant). The contact angle is thus given by $$\cos(\theta) = \cos(\theta_0) + \frac{C(V_B+V_C)^2}{2Y_{LG}} \quad \text{(equation 3)}$$

The difference in $\cos(\theta)$ between the cases of a "1" and a "0" being written can be calculated by subtracting equation (2) from equation (3)

$$\Delta(\cos(\theta)) = +\frac{CV_B(V_B+2V_C)^2}{2Y_{LG}} \quad \text{(equation 4)}$$

From equation (4) it can be seen that the energy difference (approximately $\Delta(\cos(\theta))$) can be increased by increasing $V_C$. Therefore according to the method of driving of this embodiment a greater difference in surface energy between the "1" and "0" states is achieved by extending the amplitude of the voltage signal $V_3$ applied to the electrode 38. The increased difference in energy has the advantage of improving droplet dynamics for a given TFT voltage.

Equation (4) implies that it is beneficial to make $V_C$ as large as possible. In fact this is not the case as that at a certain value, the contact angle $\theta$ saturates at a minimum value. This saturation contact angle is a function of the droplet constitution and the properties of the surface. There is thus an optimum value for $V_C$ approximately corresponding to the value whereby the contact angle reaches its saturated value $\theta_{sat}$ when a "1" state is written. The optimum value of $V_C$ can be calculated from the equation $$\cos(\theta_{sat}) \approx \cos(\theta_0) + \frac{C(V_B + V_C)^2}{2Y_{LG}} \qquad \text{(equation 5)}$$

It will be apparent that the method of driving described in the fourth embodiment can be applied to any of the first through third embodiments.

Figure 11:
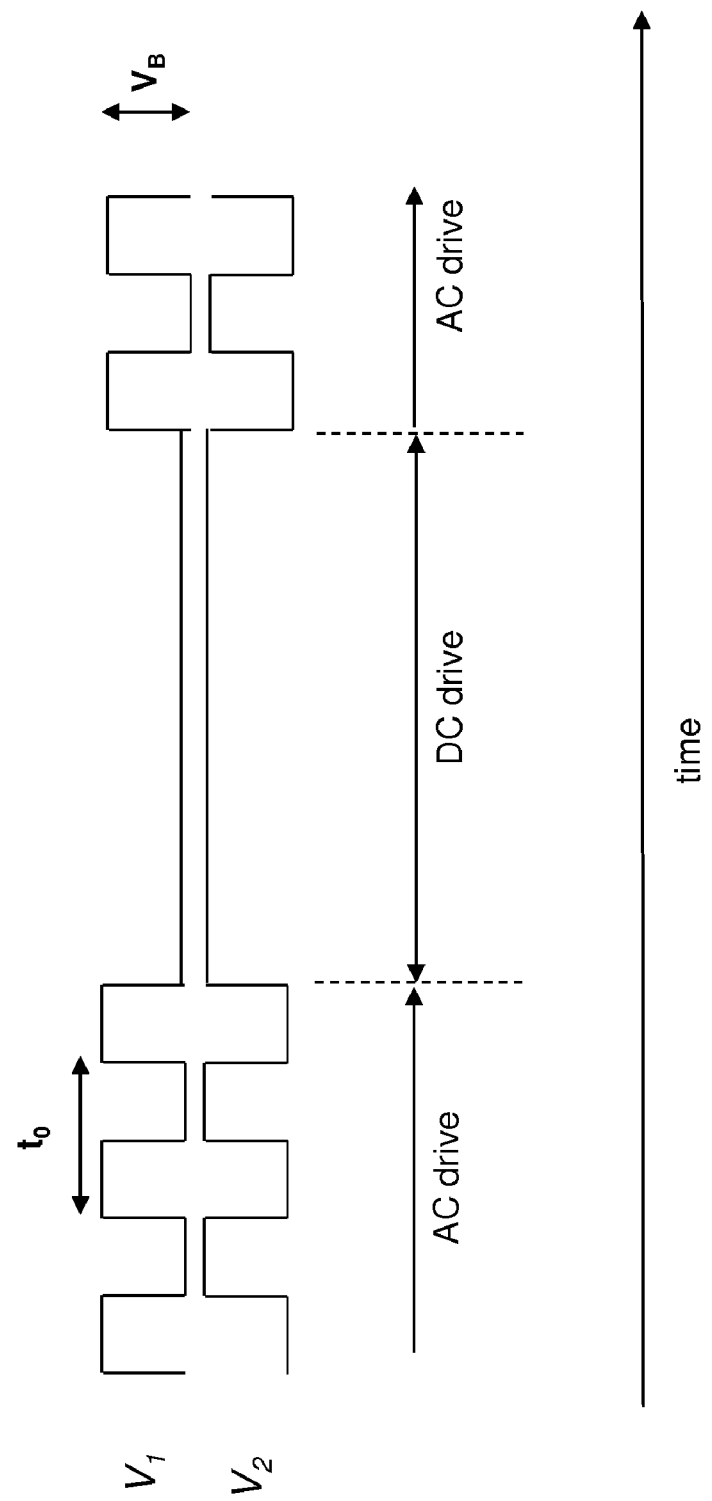
FIG. 11 shows the voltage waveforms according to a fifth embodiment of the invention.

A fifth embodiment of the invention is as any of the previous embodiments whereby a variant timing scheme for the supply voltage $V_1$ and $V_2$ is used as shown in FIG. 11.

According to the operation of this embodiment the device is configured such that AC operation is in "burst mode", for example:

for some portion of the operating time an AC drive scheme is employed. This corresponds to square wave signals being applied to $V_1$ and $V_2$ as shown in FIG. 11 for the periods of time denoted "AC drive" and as previously described for some portion of the operating time a DC drive scheme is employed. This corresponds to $V_1$ and $V_2$ being held at constant potentials as shown in FIG. 11 for the period of time denoted "DC drive". It may be noted that it is also possible to maintain $V_1$ and $V_2$ at the opposite polarities as shown in the figure (i.e. with $V_1$ high and $V_2$ low) whilst achieving the same overall effect An advantage of this embodiment is that the portion of the time for which operation is with DC drive may simultaneously be used for the operation of other electronic circuits integrated in thin film electronics 74. Examples of other integrated electronic circuits may include impedance sensor circuits and temperature sensor circuits. The DC operation of the electro-wetting function may be necessary or preferable during the times for which these other circuits are in operation. For example, if AC operation was employed during times for which an impedance sensor circuit was also operating, the AC voltage signal $V_2$ applied to the electrode 28 of the top substrate 36 may have unwanted effects in interfering with the operation of the sensor. By operating the device with "burst" mode AC operation, the timings may be configured such that a DC drive scheme is employed during times for which integrated sensors are operational, and an AC drive scheme is employed during times for which integrated sensors are non-operational, as shown in FIG. 12.

Figure 12:
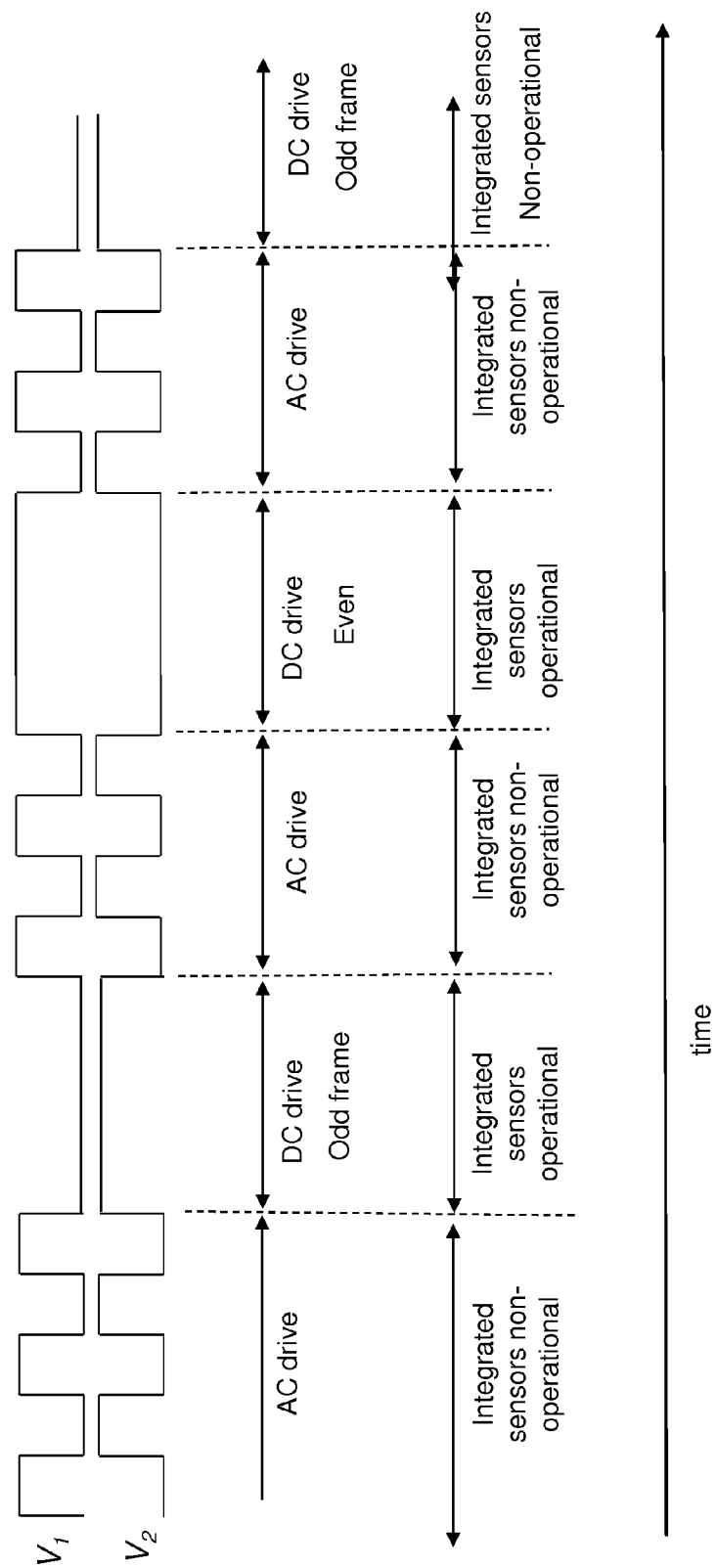
FIG. 12 shows the voltage waveforms according to the fifth embodiment of the invention, also showing the times for which integrated sensors are operational and non-operational.

The arrangement of FIG. 12 shows that the polarities of $V_1$ and $V_2$ during the periods for which DC mode operation is employed alternate between even and odd frames of DC operation. For odd frames V1 is low and V2 is high and for even frames $V_1$ is high and $V_2$ is low. This mode of operation has the particular advantage that when averaged over a suitably long time period, the time average of the $V_1$ and $V_2$ voltage signals is identical. As a result, over this long time period there is therefore no net DC voltage component maintained across the droplet. This has the advantages of improving reliability, reducing degradation, etc. as previously described.

A further advantage of this embodiment is that DC mode operation consumes less power than AC mode operation. By operating in burst mode, the advantages of AC mode operation may be realized (to a greater or lesser extent) whilst consuming less power than would be the case if an AC drive scheme was employed throughout the time of operation.

As an extension to this embodiment, it will be apparent that the supply voltage $V_1$ and $V_2$ could be driven by waveforms that are of different frequencies at different times. Furthermore it will be apparent that $V_1$ and $V_2$ can be driven by waveforms that have a duty cycle that is not necessarily 50%.

As a further extension to this embodiment, it will be apparent that the supply voltages $V_1$ and $V_2$ could also be driven with a non-square wave waveform, for example a triangular waveform, sinusoidal waveform etc.

It will be further apparent that the AM-EWOD device described could form part of a complete lab-on-a-chip system as described in prior art. Within such as system, the droplets sensed and/or manipulated in the AM-EWOD device could be chemical or biological fluids, e.g. blood, saliva, urine, etc, and that the whole arrangement could be configured to perform a chemical or biological test or to synthesize a chemical or biochemical compound.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The AM-EWOD device could form a part of a lab-on-a-chip system. Such devices could be used in manipulating, reacting and sensing chemical, biochemical or physiological materials. Applications include healthcare diagnostic testing, chemical or biochemical material synthesis, proteomics, tools for research in life sciences and forensic science.

The invention claimed is:
1. An active matrix electrowetting on dielectric (AM-EWOD) device, comprising:
a plurality of array elements configured to manipulate one or more droplets of fluid on an array, each of the array elements including a corresponding array element circuit, wherein each array element circuit includes
a top substrate electrode and a drive electrode between which the one or more droplets may be positioned;
circuitry configured to write data to the corresponding array element by selectively applying to the drive electrode either:
(i) a time-varying voltage waveform $V_1$ of amplitude $V_B$ and period $t_0$; or
(ii) a time-varying voltage waveform $V_2$, the logical inverse of $V_1$,
and applying to the top substrate electrode the time-varying voltage waveform $V_2+V_{offset}$, where $V_{offset}$ represents an offset voltage signal which may have AC and/or DC components and may equal zero.

2. The device according to claim 1, wherein $V_{offset}$ equals zero.

3. The device according to claim 1, wherein $V_{offset}$ is non-zero.

4. The device according to claim 1, wherein $V_1$ and $V_2$ are square wave voltage pulses.

5. The device according to claim 4, wherein $V_{offset}$ is a square wave voltage in phase with the square wave voltage pulse $V_2$ and having a maximum amplitude of $V_c$ and a minimum amplitude of $-V_c$ with period $t_0$.

6. The device according to claim 5, wherein the value of $V_c$ satisfies the following expression:

$$\cos(\theta_{sat}) \approx \cos(\theta_0) + \frac{C(V_B + V_C)^2}{2Y_{LG}}$$

where $\theta_{sat}$ represents a saturation contact angle of the one or more droplets within the array element, $\theta_0$ is a contact angle of the one or more droplets for zero voltage, C is an insulator capacitance within the array element, and $Y_{LG}$ is a surface tension associated with an interface between the one or more droplets and surrounding non-ionic liquid within the array element.

7. The device according to claim 1, wherein $V_1$ and $V_2$ are at least one of sinusoidal, triangular or sawtooth in shape.

8. The device according to claim 1, wherein the plurality of array elements share a common top substrate electrode.

9. The device according to claim 1, wherein the waveform $V_1$ is common to the plurality of array elements.

10. The device according to claim 1, wherein the waveform $V_2$ is common to the plurality of array elements.

11. The device according to claim 1, wherein each array element circuit includes an inversion circuit which applies the waveform $V_2$ to the drive electrode by selectively inverting the waveform $V_1$ as a function of data written to the array element.

12. The device according to claim 1, wherein each array element circuit includes a memory function for storing the data to be written to the array element.

13. The device according to claim 12, wherein the memory function comprises a DRAM circuit.

14. The device according to claim 12, wherein the memory function comprises an SRAM circuit.

15. The device according to claim 14, wherein the SRAM circuit includes a plurality of analog switches.

16. The device according to claim 1, wherein the circuitry is configured to alternate between AC mode operation and DC mode operation, such that during AC mode operation the circuitry writes data to the corresponding array element by selectively applying to the drive electrode either (i) the waveform $V_1$ of amplitude $V_B$ and period $t_0$; or (ii) the waveform $V_2$, and applying to the top substrate electrode the waveform $V_2+V_{offset}$, and during DC mode operation the circuitry holds the drive electrode and the top substrate electrode at constant potentials.

17. The device according to claim 16, wherein polarities of the constant potentials at the drive electrode and the top substrate electrode during DC mode operation are opposite.

18. The device according to claim 17, wherein the polarities of the constant potentials alternate between frames of DC mode operation.

19. The method according to claim 18, comprising the step of alternating between AC mode operation and DC mode operation, wherein during AC mode operation data is written to the corresponding array element by selectively applying to the drive electrode either (i) the waveform $V_1$ of amplitude $V_B$ and period $t_0$; or (ii) the waveform $V_2$, and applying to the top substrate electrode the waveform $V_2+V_{offset}$, and during DC mode operation holding the drive electrode and the top substrate electrode at constant potentials.

20. The method according to claim 19, wherein polarities of the constant potentials at the drive electrode and the top substrate electrode during DC mode operation are opposite.

21. The method according to claim 20, wherein the polarities of the constant potentials alternate between frames of DC mode operation.

22. A method of driving an active matrix electrowetting on dielectric (AM-EWOD) device comprising a plurality of array elements configured to manipulate one or more droplets of fluid on an array, each of the array elements including a top substrate electrode and a drive electrode between which the one or more droplets may be positioned, the method comprising:
selectively applying to the drive electrode either:
(i) a time-varying voltage waveform $V_1$ of amplitude $V_B$ and period $t_0$; or
(ii) a time-varying voltage waveform $V_2$, the logical inverse of $V_1$,
and applying to the top substrate electrode the time-varying voltage waveform $V_2+V_{offset}$, where $V_{offset}$ represents an offset voltage signal which may have AC and/or DC components and may equal zero.

23. The method according to claim 22, wherein $V_{offset}$ equals zero.

24. The method according to claim 22, wherein $V_{offset}$ is non-zero.

25. The method according to claim 22, wherein $V_1$ and $V_2$ are square wave voltage pulses.

26. The method according to claim 25, wherein $V_{offset}$ is a square wave voltage in phase with the square wave voltage pulse $V_2$ and having a maximum amplitude of $V_c$ and a minimum amplitude of $-V_c$ with period $t_0$.

27. The method according to claim 26, wherein the value of $V_c$ satisfies the following expression:

$$\cos(\theta_{sat}) \approx \cos(\theta_0) + \frac{C(V_B + V_C)^2}{2Y_{LG}}$$

where $\theta_{sat}$ represents a saturation contact angle of the one or more droplets within the array element, $\theta_0$ is a contact angle of the one or more droplets for zero voltage, C is an insulator capacitance within the array element, and $Y_{LG}$ is a surface tension associated with an interface between the one or more droplets and surrounding non-ionic liquid within the array element.

28. The device according to claim 22, wherein $V_1$ and $V_2$ are at least one of sinusoidal, triangular or sawtooth in shape.

* * * * *